(12) United States Patent
Schwandt et al.

(10) Patent No.: US 12,420,435 B2
(45) Date of Patent: Sep. 23, 2025

(54) CONVEYING DEVICE

(71) Applicant: Syntegon Technology GmbH, Waiblingen (DE)

(72) Inventors: Matthias Schwandt, Wallhausen (DE); Johannes Bäuerle, Obersontheim (DE); Sebastian Gran, Crailsheim (DE)

(73) Assignee: Syntegon Technology GmbH, Waiblingen (DE)

( * ) Notice: Subject to any disclaimer, the term of this patent is extended or adjusted under 35 U.S.C. 154(b) by 96 days.

(21) Appl. No.: 18/468,081

(22) Filed: Sep. 15, 2023

(65) Prior Publication Data
US 2024/0091959 A1 Mar. 21, 2024

(30) Foreign Application Priority Data
Sep. 20, 2022 (DE) ...................... 10 2022 124 050.9

(51) Int. Cl.
*B25J 15/02* (2006.01)
*B25J 15/00* (2006.01)

(52) U.S. Cl.
CPC ........... *B25J 15/02* (2013.01); *B25J 15/0038* (2013.01)

(58) Field of Classification Search
CPC .... B25J 15/0038; B25J 15/02; B25J 15/0213; B25J 15/022; B25J 15/0246;
(Continued)

(56) References Cited

U.S. PATENT DOCUMENTS 4,400,984 A * 8/1983 Ronbeck .............. B65G 47/902
414/752.1
4,618,309 A 10/1986 Gregg et al.
(Continued)

FOREIGN PATENT DOCUMENTS

DE 3404553 9/1985
DE 102014010917 A1 1/2016
(Continued)

OTHER PUBLICATIONS

European Patent Office Search Report for Application No. 23197301.7 dated Feb. 12, 2024 (11 pages including English translation).
(Continued)

*Primary Examiner* — Saul Rodriguez
*Assistant Examiner* — Brendan P Tighe
(74) *Attorney, Agent, or Firm* — Michael Best & Friedrich LLP

(57) ABSTRACT

A conveying device includes a first drive body, a second drive body and a lifting body for receiving a payload. The drive bodies can be activated independently of each other along a conveying axis or on a conveying plane. A first lifting link is pivotably articulated to the first drive body and a second lifting link is pivotably articulated to the second drive body. The lifting links are functionally connected to the lifting body so that a relative movement of the drive bodies can be converted into a movement of the lifting body along a lifting axis A first guide link is pivotably articulated to the first drive body, a second guide link is pivotably articulated to the second drive body, the guide links are connected to a first guide element, the lifting body has a second guide element, and the guide elements form a linear guide with a guide axis that coincides with the lifting axis.

13 Claims, 6 Drawing Sheets

(58) Field of Classification Search
CPC .... B25J 15/0266; B25J 15/0273; B25J 15/0293;
B60G 2200/3415; B65G 47/902; F16H
21/10; F16H 21/16; F16H 21/22; F16H
21/30; F16H 21/32; F16H 21/44
USPC .............. 74/112, 120, 126, 130, 133, 168
See application file for complete search history.

(56) References Cited

U.S. PATENT DOCUMENTS

| | | | |
|---|---|---|---|
| 5,248,923 A | 9/1993 | Kimrua et al. | |
| 5,634,376 A * | 6/1997 | Kitamura | B65G 47/902 |
| | | | 74/89.32 |
| 8,104,710 B2 | 1/2012 | Harvey et al. | |
| 8,522,679 B2 * | 9/2013 | Zeibig | B21D 43/057 |
| | | | 100/207 |
| 9,199,297 B2 * | 12/2015 | Müller | B21D 43/00 |
| 9,505,137 B2 * | 11/2016 | Sasaki | B25J 17/00 |
| 9,668,572 B2 * | 6/2017 | Ergun | A47B 21/02 |
| 10,602,840 B2 * | 3/2020 | Ergun | A47B 21/02 |
| 10,926,406 B2 * | 2/2021 | Prüssmeier | B25J 9/106 |
| 2002/0182036 A1 * | 12/2002 | Lowrance | B25J 9/106 |
| | | | 414/217 |
| 2007/0295052 A1 * | 12/2007 | Nock | B21D 43/055 |
| | | | 72/405.16 |
| 2008/0277205 A1 * | 11/2008 | Kim | B66F 7/0633 |
| | | | 187/250 |
| 2010/0047051 A1 | 2/2010 | Knobel | |
| 2017/0057096 A1 * | 3/2017 | Saadat | B25J 15/10 |
| 2017/0165738 A1 * | 6/2017 | Ito | B65G 54/02 |
| 2019/0255698 A1 | 8/2019 | Zeiner et al. | |
| 2020/0030995 A1 * | 1/2020 | Lu | H02K 7/14 |
| 2022/0037181 A1 * | 2/2022 | Hatano | H01L 21/67196 |
| 2022/0110336 A1 * | 4/2022 | Runkel | B65G 54/02 |
| 2022/0130701 A1 * | 4/2022 | Hatano | H01L 21/67196 |
| 2022/0223447 A1 * | 7/2022 | Hatano | H01L 21/67742 |
| 2022/0415688 A1 * | 12/2022 | Hatano | B25J 9/12 |

FOREIGN PATENT DOCUMENTS

| | | |
|---|---|---|
| EP | 0446378 | 1/1994 |
| WO | 2018176137 A1 | 10/2018 |

OTHER PUBLICATIONS

Office Action for German Application No. 10 2022 124 050.9 mailed on Jul. 18, 2023, 7 pages.

* cited by examiner

CONVEYING DEVICE

BACKGROUND

From US 2020/0030995 A1 it is known to drive a lifting body by means of a parallelogram kinematic mechanism or a gear unit.

SUMMARY

The invention relates to a conveying device, comprising a first drive body, a second drive body and a lifting body for receiving a payload, wherein the drive bodies can be activated independently of each other along a conveying axis or on a conveying plane, wherein a first lifting link is pivotably articulated to the first drive body and a second lifting link is pivotably articulated to the second drive body, wherein the lifting links are functionally connected to the lifting body so that a relative movement of the drive bodies can be converted into a movement of the lifting body along a lifting axis.

On this basis, the present invention is based on the object of specifying a conveying device which makes it possible to move the lifting body in a stable and precise manner.

This object is achieved in a conveying device of the type mentioned at the outset in that a first guide link is pivotably articulated to the first drive body, in that a second guide link is pivotably articulated to the second drive body, in that the guide links are connected to a first guide element, in that the lifting body has a second guide element, and in that the guide elements form a linear guide with a guide axis which coincides with the lifting axis.

The conveying device according to the invention makes it possible to guide the lifting body along the lifting axis in a precise, robust and low-wear manner. For this purpose, a first guide element is provided which is articulated to guide links and acts to guide a second guide element which is connected to the lifting body. The two guide elements form a linear guide with a guide axis which corresponds to the lifting axis, i.e., it is identical to the lifting axis in respect of the position and orientation thereof.

The guide links are each articulated to one of the drive bodies and are swiveled during the course of a relative movement of the two drive bodies, wherein the second guide element performs a lifting movement along the guide axis.

In the simplest case, the lifting links and guide links are articulated to the respective drive bodies and to the lifting body and the second guide element via simple pivot or rotary bearings, which ideally take the form of plain bearings.

It is further preferred that the guide elements form a plain bearing. Plain bearing s increase the suitability of the conveying device for critical environments, for example in cleanroom environments, in particular for medical and pharmaceutical applications.

The conveying device according to the invention is also distinguished in that the lifting body is guided in a particularly accurate manner, so that the lifting body can be used for a large number of operating tasks. For example, the lifting body can be used to perform lifting movements, setting down movements, filling nozzle movements and/or stopper placement movements, opening operations and closing operations, wherein both small, delicate objects (for example syringes, vials, ampoules or cartridges) and larger objects (for example Petri dishes) can be handled. It is also possible to handle and convey loaded or empty container carriers.

It is possible for the two drive bodies to be guided along a conveying axis, i.e., they can each only move "forward" and "backward" along the conveying axis. It is preferred that the drive bodies are what are known as "movers" which can be driven electromagnetically on a two-dimensional drive surface, the drive bodies being located at a distance from this drive surface across an operating gap and being freely movable and positionable on the drive surface in accordance with the extent thereof.

The lifting axis is preferably oriented perpendicularly to the conveying axis or the conveying plane, thereby optimizing a working stroke of the conveying lifting device.

The first guide element is preferably formed by a sleeve or a rail. The sleeve is in particular circumferentially closed and makes it possible to support a second guide element, in particular a pin, which is received securely in the sleeve with a tight clearance fit.

If the first guide element is formed by a rail, it is preferable for the second guide element to be formed by a carriage guided on the rail.

It is further preferred that the lifting links are of equal length and/or that the guide links are of equal length. This makes it possible to produce a symmetrical arrangement free of lateral forces.

It is further preferred if the first lifting link and the first guide link on the first drive body can be swiveled about a common first pivot shaft and/or if the second lifting link and the second guide link on the second drive body can be swiveled about a common second pivot shaft. This simplifies the construction of the drive bodies and pivot bearings.

A further preferred embodiment of the invention provides that the first drive body has a first rotary bearing with a first axis of rotation parallel to the lifting axis, and that the first pivot shaft is mounted so as to be rotatable about the first axis of rotation, and/or that the second drive body has a second rotary bearing with a second axis of rotation parallel to the lifting axis, and that the second pivot shaft is mounted so as to be rotatable about the second axis of rotation. Axes of rotation of this type are particularly preferred if the drive bodies are the aforementioned "movers". A lifting movement, with a simultaneous (horizontal) displacement of the lifting axis relative to the conveying plane, can thus also be generated, for example by activating and moving only one of the two drive bodies, while the other drive body remains stationary and the pivot bearing thereof rotates about the associated axis of rotation.

It is further preferred if the lifting links, at the respective ends thereof which are at a distance from the drive bodies, are articulated to lifting body pivot bearings which are arranged at mutually identical first distances from the lifting axis, and/or if the guide links, at the respective ends thereof which are at a distance from the drive bodies, are articulated to guide pivot bearings which are arranged at mutually identical second distances from the guide axis. This measure also helps to guide the lifting body along the lifting axis in a precise manner free of transverse forces.

The first distances and the second distances mentioned are preferably identical, so that a linear guide which is free, at least to the greatest possible extent, of tilting forces is produced.

In a particularly preferred embodiment, it is provided that the lifting body has a work region and a gripping device, and that the second guide element and the work region are connected to each other via an additional gear mechanism which enables the second guide element to move relative to the work region along the lifting axis over an actuation stroke, wherein the gripping device can be transferred from an open grip position to a closed grip position by means of the actuation stroke. This makes it possible to use a portion of the stroke height of the lifting body to actuate a gripping device rather than lifting the lifting body, in particular without requiring any additional actuators for this purpose.

Preferably a locking mechanism is provided, which operates between at least one of the guide links and an arm of the work region and blocks a lifting movement of the work region until the actuation stroke is completed. The locking mechanism thus acts as a forced control means for converting a movement of the drive bodies first into an actuation stroke which actuates the gripping device, and only subsequently into a lifting movement of the lifting body and thus also the work region and the gripping device in the actuated, in particular closed, state thereof.

The locking mechanism has for example at least one locking finger which is pivotably articulated to one of the guide links and operates, at least during the actuation stroke, between the arm of the work region and a crosspiece connected to the second guide element. This makes it possible to achieve a forced control means with a simple construction which is well suited for use in cleanrooms.

BRIEF DESCRIPTION OF THE DRAWINGS

Further features and advantages of the invention form the subject matter of the following description and the drawings of the embodiments, in which.

DETAILED DESCRIPTION

Figure 1:
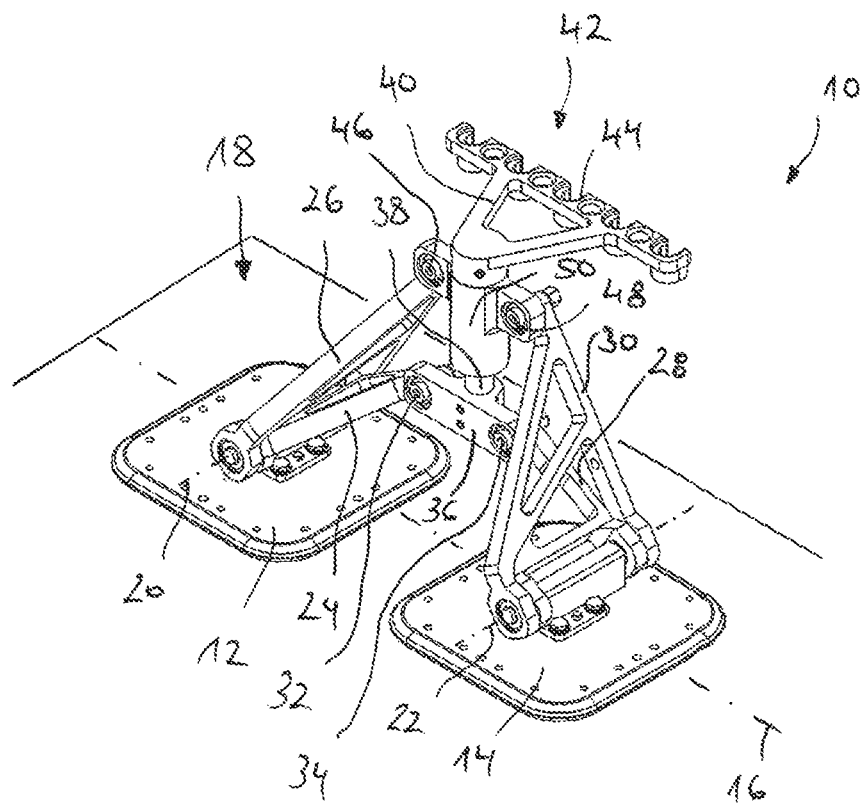
FIG. 1 shows a perspective view of an embodiment of a conveying device.
Figure 2:
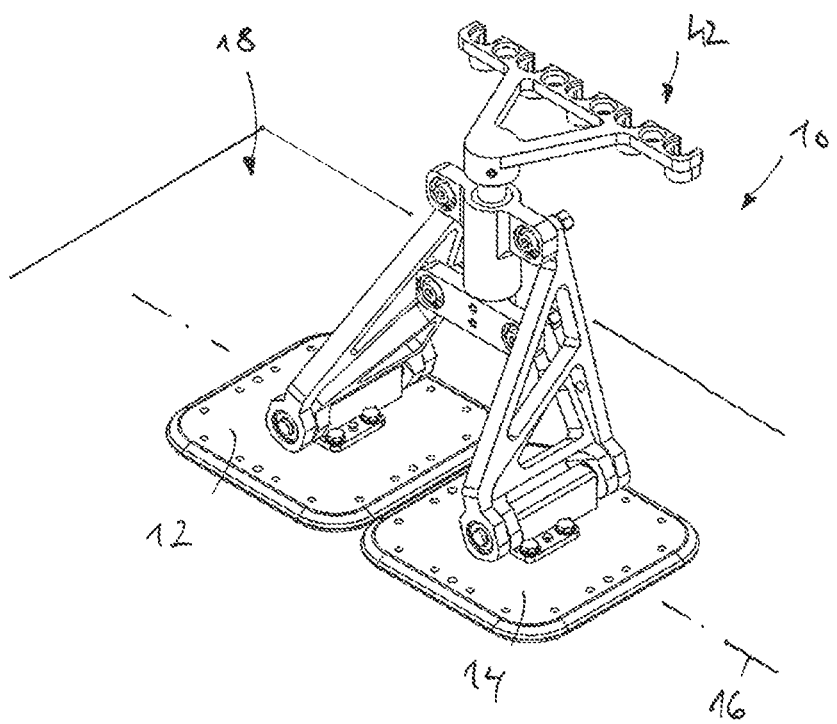
FIG. 2 shows a view corresponding to FIG. 1, wherein a work region of the conveying device is raised.
Figure 3:
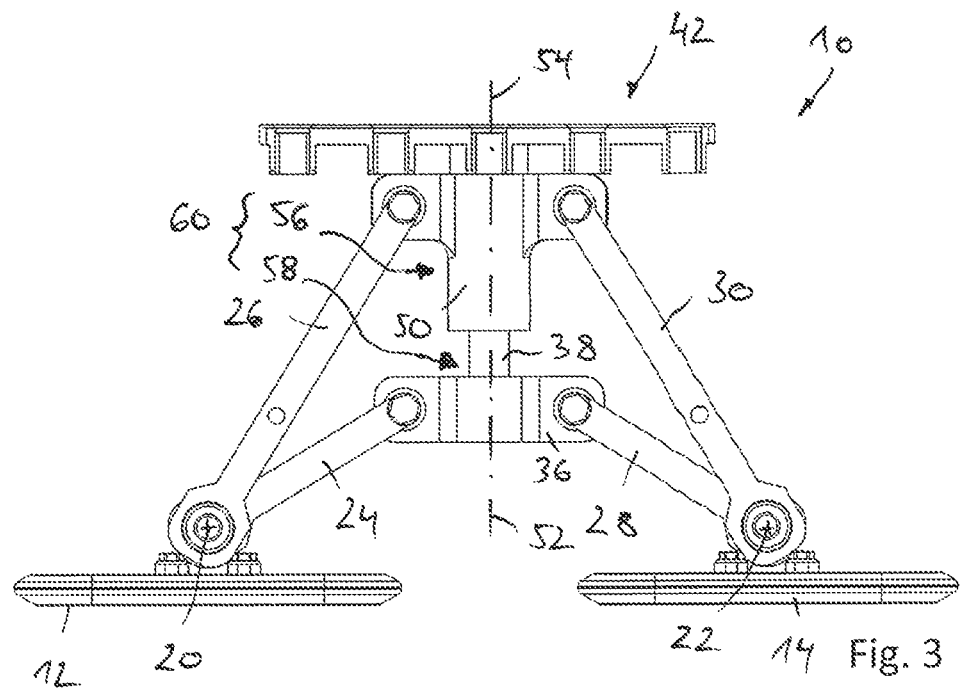
FIG. 3 shows a front view of the conveying device, in a state according to FIG. 1.
Figure 4:
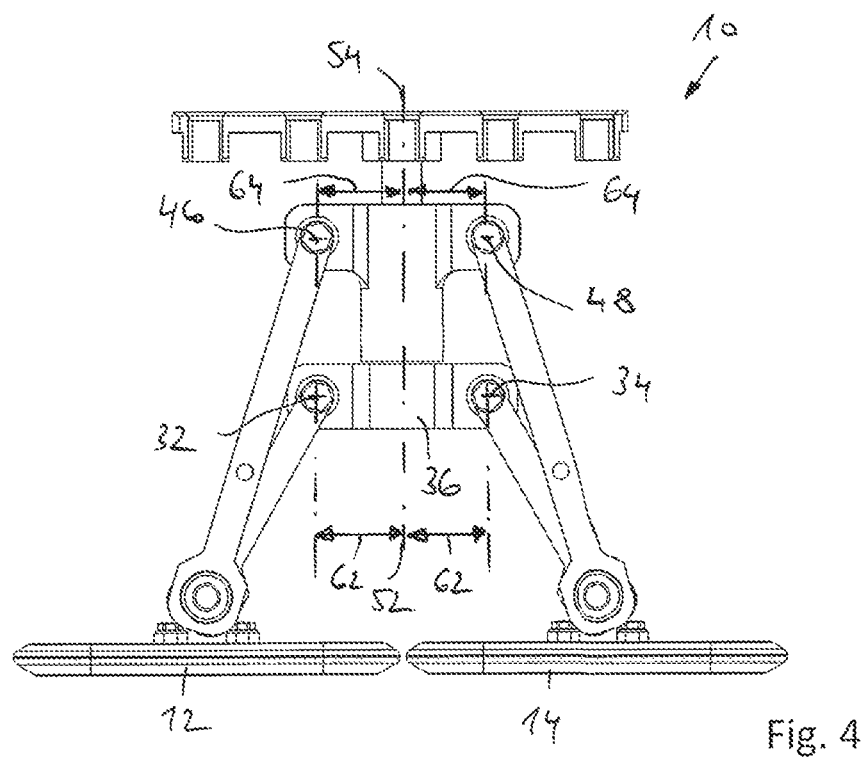
FIG. 4 shows a front view of the conveying device, in a state according to FIG. 2.

In the drawings, a conveying device in its entirety is denoted with the reference sign 10. This conveying device comprises a first drive body 12 and a second drive body 14. The drive bodies 12 and 14 can be activated independently of each other, for example only along a conveying axis 16 or across a conveying plane 18.

The first drive body 12 bears a first pivot shaft 20, by means of which a first lifting link 24 and a first guide link 26 are pivotably articulated.

The second drive body 14 bears a second pivot shaft 22, by means of which a second lifting link 28 and a second guide link 30 are pivotably articulated.

The first lifting link 24 and the second lifting link 28 are articulated to a crosspiece 36 via respective lifting body pivot bearings 32 and 34. The crosspiece 36 is connected to a pin 38 which extends in a vertical direction and is connected to a work region 40 of a lifting body 42. The lifting body 42 has work portions 44, which act for example to hold objects.

The ends of the guide links 26 and 30 which are at a distance from the respective pivot bearings 20 and 22 are articulated to respective guide pivot bearings 46, 48, which are connected to a sleeve 50, in which the pin 38 is mounted so as to be able to slide.

A change in the distance between the drive bodies 12 and 14 (cf. FIGS. 1 and 2 or 3 and 4) causes the lifting links 24 and 28 to swivel about the respective pivot axes 20, 22 and raise or lower the crosspiece 36 together with the pin 38 and the lifting body 42 along a lifting axis 52. At the same time, a change in the distance between the two drive bodies 12 and 14 causes the two guide links 26 and 28 also to swivel about the pivot bearings 20, 22 and raise or lower the sleeve 50 along a guide axis 54.

The guide axis 54 and the lifting axis 52 coincide with each other, i.e., they are therefore identical in respect of the position and orientation thereof.

The sleeve 50 forms a first guide element 56 and the pin 38 forms a second guide element 58 of a linear guide 60.

The lifting links 24 and 28 are preferably of equal length. Furthermore, it is preferred if the guide links 26 and 30 are of equal length but are longer respectively than the lifting links 24 and 28.

At the level of the crosspiece 36 relative to the lifting axis 52, the lifting body pivot bearings 32 and 34 are located at mutually identical first distances 62 from the lifting axis 52.

The guide pivot bearings 46 and 48 are located at mutually identical second distances 64 from the guide axis 54. Preferably, the first distances 62 and second distances 64 are also identical.

Figure 5:
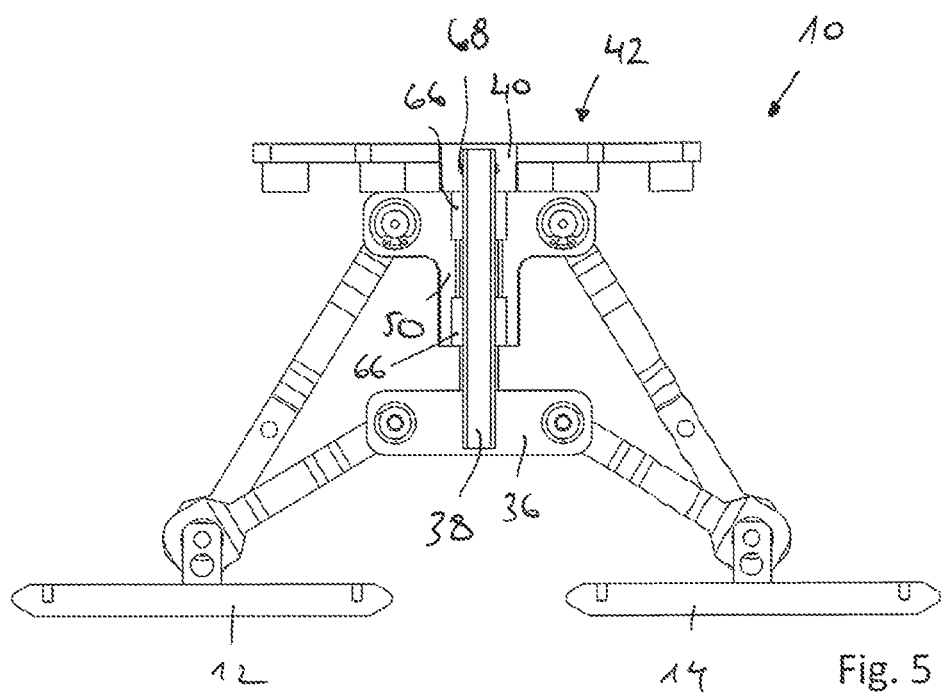
FIG. 5 shows a vertical section of the conveying device, in a state according to FIG. 1.

In order to guide the pin 38 relative to the sleeve 50 in a particularly precise and low-friction manner, it is possible for the sleeve 50 to have plain bearing bushes 66 (cf. FIG. 5). The latter can be produced for example from a low-friction plastics material, for example PTFE.

In the exemplary embodiment according to FIGS. 1 to 5, the second guide element 58, for example in the form of the pin 38, is directly and immovably connected to the work region 40 of the lifting body 42 via a connecting region 68.

In an exemplary embodiment described below with reference to FIGS. 6 to 9, instead of a rigid connecting region 68, an additional gear mechanism 70 is provided which has the effect that a lifting movement of the pin 38 along the lifting axis 52 is not fully translated into a corresponding lifting movement of the work region 40 of the lifting body 42.

Figure 8:
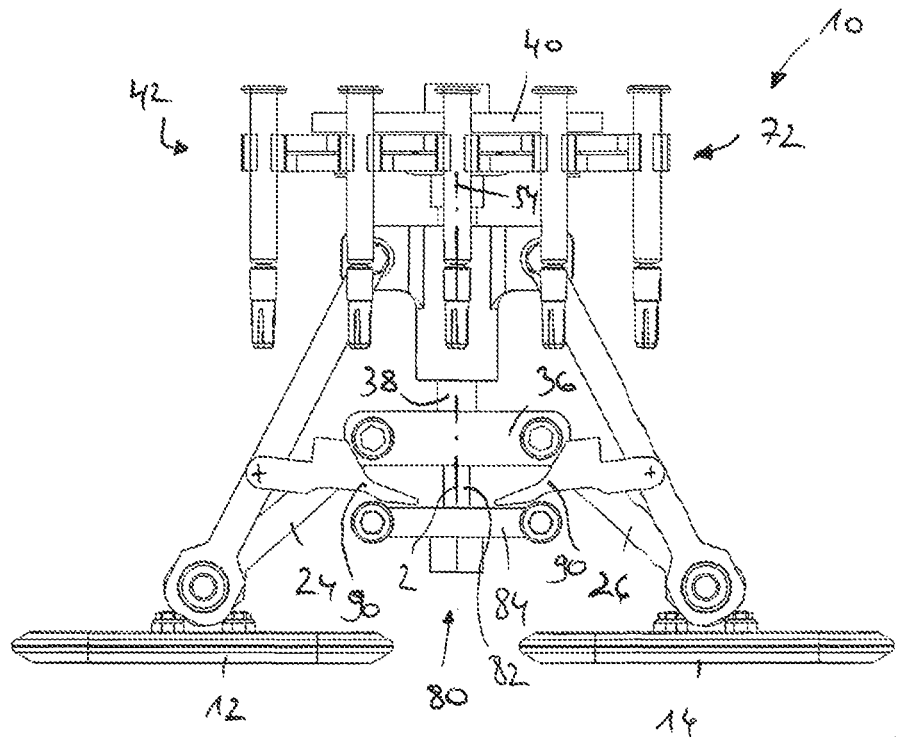
FIG. 8 shows a view corresponding to FIG. 6 after an actuation stroke has been performed for actuating a gripping device.

The lifting body 42 of the embodiment according to FIGS. 6 to 9 has a gripping device 72 which can be actuated by means of the additional gear mechanism 70 between an open grip position (cf. FIG. 6) and a closed grip position (cf. FIG. 8).

The additional gear mechanism 70 has two additional links 74, which are each connected at one end to the second guide element 58, for example the pin 38, and at the other end to actuating portions 76 of the gripping device 72. Moving the second guide element 58 along the lifting axis 52 (cf. from a state according to FIGS. 6 and 7) upward (cf. FIG. 8) causes the second guide element 58 to be raised along the lifting axis 52, thereby also raising the additional links 74 and, as a result of the articulation thereof to the actuating portions 76, actuating these actuating portions 76 in an actuating plane perpendicular to the lifting axis 52, thereby closing the gripping device 72.

An actuation stroke required for this purpose is denoted in the drawings (see FIG. 7) with the reference sign 78. The extent of the actuation stroke 78 corresponds to the displacement of the second guide element 58 along the lifting axis 52, without this displacement contributing to a lifting movement of the work region 40.

In order to prevent the work region 40 from being raised along the lifting axis 52 before the actuation stroke 78 is completed, the device 10 has a locking mechanism 80. The locking mechanism 80 comprises a connecting rod 82 (cf. FIG. 7) which is connected at one end to the work region 40 and at the other end to an arm 84 which extends, in a similar manner to the crosspiece 36, transversely to the lifting axis 52. It is preferred that the connecting rod 82 is arranged within the pin 38, which is configured to be hollow in this case.

The locking mechanism 80 further comprises two locking fingers 86 which are each pivotably articulated via bearings 88 to the guide links 28, 30.

The locking fingers 86 have a wedge-shaped engagement region 90, which operates in each case between the arm 84 of the work region 40 and the crosspiece 36.

After the actuation stroke 78 is completed, a further reduction in the distance between the drive bodies 12 and 14 causes the crosspiece 36 to be raised further along the lifting axis 52, wherein this lifting motion is now transferred to the work region 40 via the additional gear mechanism 70, and wherein the work region 40 follows the arm 84 via the connecting rod 82.

The first guide element 56, for example in the form of the sleeve 50, is also displaced along the guide axis 54 during both the actuation stroke 78 and the subsequent lifting movement of the work area 40.

Figure 6:
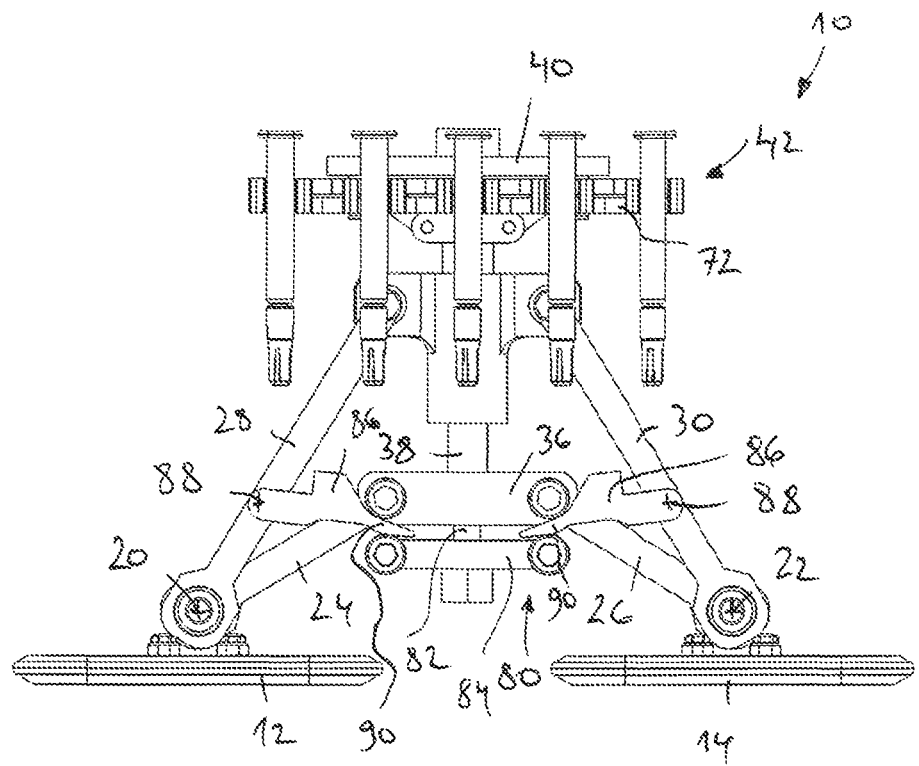
FIG. 6 shows a view corresponding to FIG. 3 of a further embodiment of a conveying device.
Figure 7:
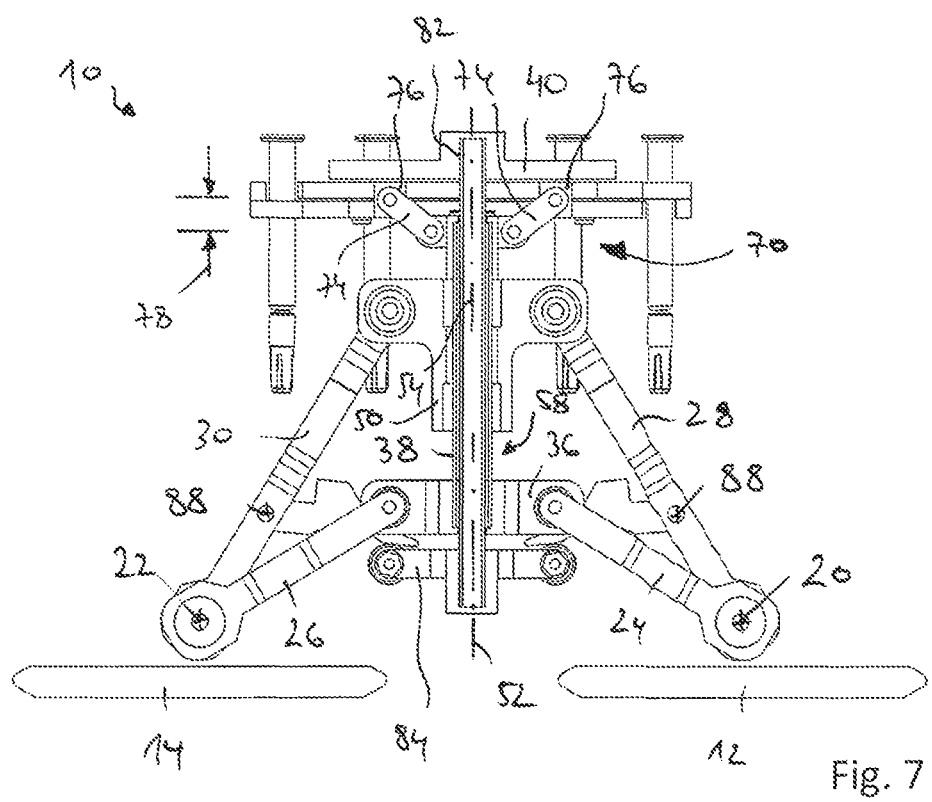
FIG. 7 shows a vertical section of the conveying device according to FIG. 6.
Figure 9:
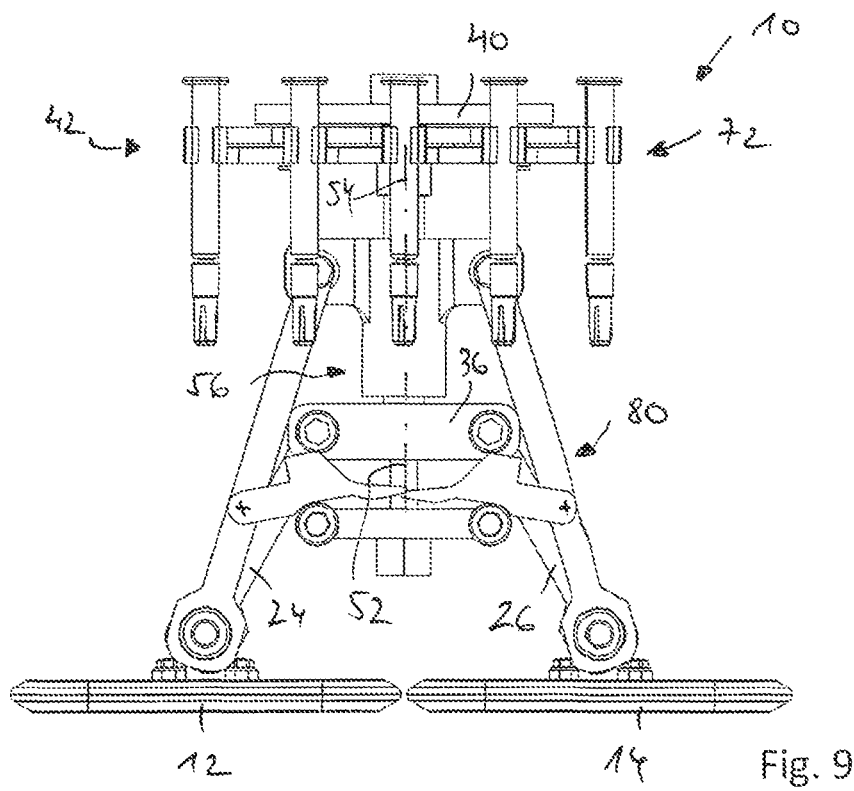
FIG. 9 shows a view corresponding to FIG. 8, after the work region of the conveying device has been raised.

In other respects, with regard to the construction and mode of operation of the embodiment according to FIGS. 6 and 9, reference is made to the above description of the conveying device 10 according to FIGS. 1 to 5.

The conveying device 10 described below with reference to FIG. 10 has, in addition to the conveying devices 10 previously described, rotary bearings 92 and 94 which are connected to the drive bodies 12, 14 respectively and each define axes of rotation 96, 98 which extend perpendicularly to the conveying axis 16 or the conveying plane 18. Rotary bearings 92, 94 of this type can also be provided in the above-described embodiments according to FIGS. 1 to 9.

Figure 10:
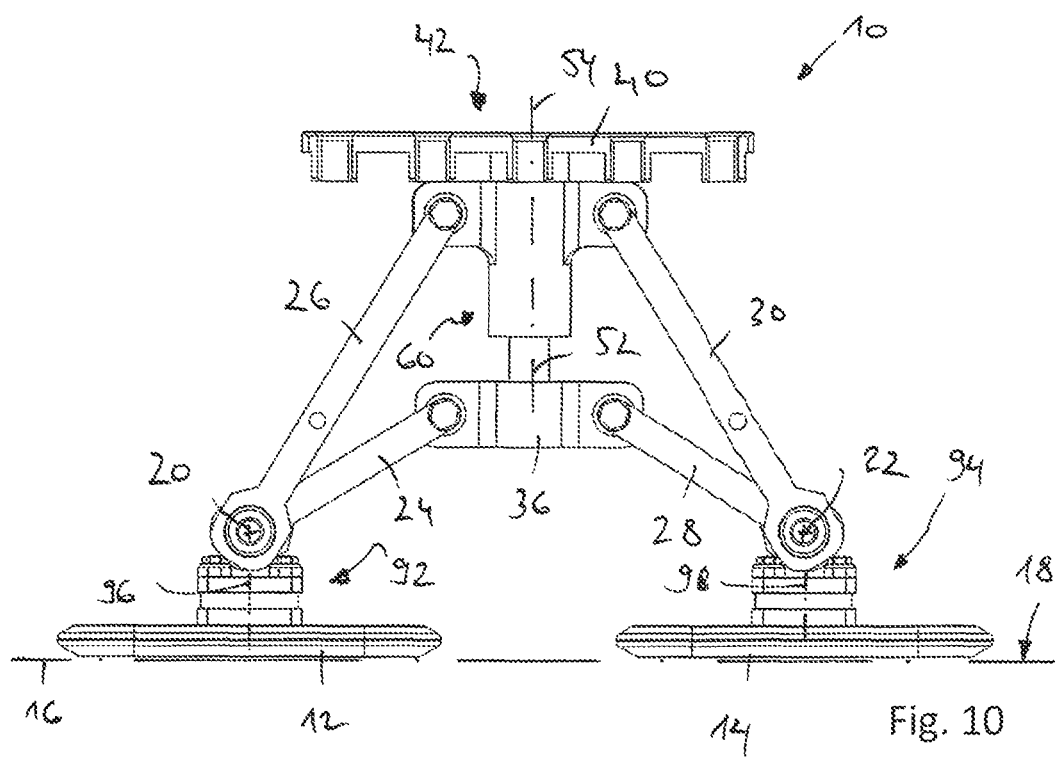
FIG. 10 shows a view corresponding to FIG. 3 of a further embodiment of a conveying device.

In other respects, with regard to the construction and mode of operation of the conveying device 10 according to FIG. 10, reference is made to the above description of the embodiment according to FIGS. 1 to 5.

What is claimed is:

1. A conveying device (10), comprising a first drive body (12), a second drive body (14) and a lifting body (42) for receiving a payload, wherein the drive bodies (12, 14) can be activated independently of each other along a conveying axis (16) or on a conveying plane (18),
    wherein a first lifting link (24) is pivotably articulated to the first drive body (12) and a second lifting link (28) is pivotably articulated to the second drive body (14),
    wherein the lifting links (24, 28) are functionally connected to the lifting body (42) so that a relative movement of the drive bodies (12, 14) can be converted into a movement of the lifting body (42) along a lifting axis (52),
    wherein a first guide link (26) is pivotably articulated to the first drive body (12), a second guide link (30) is pivotably articulated to the second drive body (14), the guide links (26, 30) are connected to a first guide element (56), the lifting body (42) has a second guide element (58) that is connected to the lifting links (24, 26), and the guide elements (56, 58) form a linear guide (60) with a guide axis (54) which coincides with the lifting axis (52), and
    wherein there is a single, slidable connection between the first guide element (56) and the second guide element (58).

2. The conveying device (10) according to claim 1, wherein the lifting axis (52) is oriented perpendicularly to the conveying axis (16) or the conveying plane (18).

3. The conveying device (10) according to claim 1, wherein the first guide element (56) is formed by a sleeve (50) or a rail.

4. The conveying device (10) according to claim 1, wherein the second guide element (58) is formed by a pin (38) or a carriage.

5. The conveying device (10) according to claim 1, wherein the guide links (26, 30) are longer than the lifting links (24, 28).

6. The conveying device (10) according to any claim 1, wherein the lifting links (24, 28) are of equal length and/or the guide links (26, 30) are of equal length.

7. The conveying device (10) according to claim 1, wherein the first lifting link (24) and the first guide link (26) on the first drive body (12) can be swiveled about a common first pivot shaft (20) and/or the second lifting link (28) and the second guide link (30) on the second drive body (14) can be swiveled about a common second pivot shaft (22).

8. The conveying device (10) according to claim 7, wherein the first drive body (12) has a first rotary bearing (92) with a first axis (96) of rotation parallel to the lifting axis (52), and the first pivot shaft (20) is mounted so as to be rotatable about the first axis (96) of rotation, and/or the second drive body (14) has a second rotary bearing (94) with a second axis (98) of rotation parallel to the lifting axis (52), and the second pivot shaft (22) is mounted so as to be rotatable about the second axis (98) of rotation.

9. The conveying device (10) according to claim 1, wherein the lifting links (24, 28), at respective ends thereof which are at a distance from the drive bodies (12, 14), are articulated to lifting body pivot bearings (32, 34) which are arranged at mutually identical first distances (62) from the lifting axis (52), and/or the guide links (26, 30), at respective ends thereof which are at a distance from the drive bodies (12, 14), are articulated to guide pivot bearings (46, 48) which are arranged at mutually identical second distances (64) from the guide axis (54).

10. The conveying device (10) according to claim 9, wherein the first distances (62) and the second distances (64) are identical.

11. The conveying device (10) according to claim 1, wherein the lifting body (42) has a work region (40) and a gripping device (72), and the second guide element (58) and the work region (40) are connected to each other via an additional gear mechanism (70) which enables the second guide element (58) to move relative to the work region (40) along the lifting axis (52) over an actuation stroke (78), wherein the gripping device (72) can be transferred from an open grip position to a closed grip position by the actuation stroke (78).

12. The conveying device (10) according to claim 11, wherein a locking mechanism (80) is provided, which operates between at least one of the guide links (26, 30) and an arm (84) of the work region (40) and blocks a lifting movement of the work region (40) until the actuation stroke (78) is completed.

13. The conveying device (10) according to claim 12, wherein the locking mechanism (80) comprises at least one locking finger (86) which is pivotably articulated to one of the guide links (26, 30) and operates, at least during the actuation stroke (78), between the arm (84) of the work region (40) and a crosspiece (36) connected to the second guide element (58).

\* \* \* \* \*